United States Patent [19]
Taylor et al.

[11] 3,851,318
[45] Nov. 26, 1974

[54] LIQUID CRYSTAL INFORMATION STORAGE AND READ-OUT SYSTEM

[75] Inventors: Ted R. Taylor, Florianopolis S.C., Brazil; James L. Fergason, Kent, Ohio

[73] Assignee: International Liquid Xtal Company, Cleveland, Ohio

[22] Filed: Oct. 11, 1973

[21] Appl. No.: 405,431

Related U.S. Application Data

[62] Division of Ser. No. 199,599, Nov. 17, 1971, Pat. No. 3,775,757.

[52] U.S. Cl. .................. 340/173 LS, 350/160 LC
[51] Int. Cl. ........................................ G11c 13/04
[58] Field of Search ....... 340/173 R, 173.2, 173 LT, 340/173 LS, 173 LM, 173 CC; 350/157, 160 LC

[56] References Cited
UNITED STATES PATENTS

| | | | |
|---|---|---|---|
| 3,239,671 | 3/1966 | Buhrer | 250/199 |
| 3,466,616 | 9/1969 | Bron et al. | 340/173 CC |
| 3,551,026 | 12/1970 | Heilmeier | 350/160 LC |
| 3,592,526 | 7/1971 | Dreyer | 350/160 LC |
| 3,694,053 | 9/1972 | Kahn | 350/160 LC |
| 3,723,346 | 3/1973 | Taylor et al. | 350/160 LC |

OTHER PUBLICATIONS

Further Report on Liquid–Crystal Infrared Pattern Viewer, Laser Focus, Mar. 1, 1965, pp. 9, 10.
Keilmann, Infrared Interferometry with a $CO_2$ Laser Source and Liquid Crystal Detection, Applied Optics, 6/70, Vol. 9, No. 6, pp. 1,319–1,322.

*Primary Examiner*—Stuart N. Hecker
*Attorney, Agent, or Firm*—Brown, Murray, Flick & Peckham

[57] ABSTRACT

The unique properties of the Smectic C-phase of a liquid crystal are used to store information represented by the bistable orientation directions of molecular axes. Groups of molecules contained between transparent surfaces which are treated in a particular manner to develop optical homogeneity are used as storage elements. The information state of the storage element is set by causing the molecular axes within the element to assume either a first or a second stable orientation of the axes. Various methods for reading, writing, and erasing information stored in this manner are disclosed.

10 Claims, 9 Drawing Figures

FIRST STABLE MOLECULAR ORIENTATION

SECOND STABLE MOLECULAR ORIENTATION

LIQUID CRYSTAL INFORMATION STORAGE AND READ-OUT SYSTEM

CROSS-REFERENCES TO RELATED APPLICATIONS

This application is a division of copending application Ser. No. 199,599 filed Nov. 17, 1971, now U.S. Pat. No. 3,775,757.

BACKGROUND OF THE INVENTION

The invention is based upon a new principle of information storage not believed to be previously known. Accordingly, the following references are submitted for the purpose of definition and general information only:

H. Sackmann and D. Demus, *Molecular Crystals*, Vol. 2, page 81 (1966)

A. Saupe, *Molecular Crystals and Liquid Crystals*, Vol. 7, page 59 (1969)

SUMMARY OF THE INVENTION

The information, storage and read-out system of the invention includes a layer of Smectic C-phase liquid crystal between two transparent containing surfaces which are given a surface treatment to insure that the molecular layers of the crystal will be parallel to the surfaces and that the orientation of the long axes of th molecules in the crystal will be constrained uniformly to assume one of two stable directions referred to herein as first and second molecular axes orientations.

It has been found that when the surfaces containing the Smectic C-phase liquid crystal are properly treated, as is considered in detail in the following, the long axes of the molecules of the crystal are then constrained to assume what is referred to herein as normal tilt angle with respect to one containing surface in one stable state and what may be referred to as a complementary tilt angle with respect to the surface in a second stable state. It has been found that the molecular axes of many Smectic C-compounds have normal tilt angles of approximately 45° so that the complementary tilt angle is approximately 135°, being rotated in space by approximately 90° from the tilt angle. Compounds of this type are bis-(4'-n-decyloxybenzal)-2-chloro-1,4-phenylenediamine, 4-n-nonyloxybenzoic acid and 4,4'-di-n-heptyloxyazoxybenzene. It will be understood, of course, that it is not necessary in the practice of the invention that the normal tilt angle be confined to exactly 45° although, as will be seen, this insures the best mode of operation.

In order to simplify the explanation of the invention in the following it will be assumed that the normal tilt angle is 45° and that the complementary tilt angle is rotated 90° therefrom. It will also be assumed that the first stable state occurs when the molecular axes of a storage element are aligned along the 45° tilt angle and that this stable state occurs after erasure and represents an OFF or binary "0" condition. Thus, with this convention, the second stable state becomes that during which the molecular axes of a selected storage element are aligned along the complementary tilt angle. The second state will, as a matter of convenience only, be assumed to occur in a selected storage element that is subjected to writing energy and the state will be assumed to be the ON state or binary "1" condition. It will also be assumed that the energy required to cause rotation from the first stable state to the second stable state is write energy and that the energy required to cause rotation from the second stable state to the first stable is erase energy. This terminology is selected entirely as a matter of convenience since the invention may be employed to use erase energy to force the second stable state rather than the first and write energy to force the first stable state rather than the second.

In reading the state of the memory elements, use is made of the birefringent characteristic of the liquid crystal layer. According to the optical principle of birefringence, if the molecules of a particular molecular group have axes parallel to the plane of polarization of low intensity light (selected so as not to change the energy state of the molecules), the polarization of the light is rotated through some angle which depends upon the magnitude of birefringence and other factors as it passes through that particular molecular group, whereas no rotation occurs when the molecular axes of the group are normal to the polarization plane. The manner in which the birefringent effect is used will be more fully understood when the invention is described in further detail in the following. The important thing to note is that when the long axes of a selected molecular group have been rotated by means of write energy to align with the second stable molecular axes orientation, low intensity reading light passes through the selected molecular group without rotation whereas when erase energy sets a selected or all molecular groups to the first stable state the low intensity reading light is rotated.

From the point of view of reading, it may be stated that the two information states are represented by whether or not the liquid crystal at a particular memory element point or within a particular grouping of molecules causes birefringent rotation or not. The state of all molecular groups may then be observed and sensed electrically by viewing the light which passes through all memory elements and through a second plane of polarization which is parallel to the first. The polarization in the second plane of polarization is crossed or rotated 90° with respect to the polarization of the first plane.

Thus memory elements in the first stable state exhibiting birefringence will rotate the polarized light received so as to be viewed as a corresponding light spot through the second, crossed polarizer; whereas memory elements in the second stable state which are not birefringent will not cause rotation of the reading light and consequently will appear as dark spots as viewed through the second polarizer.

It will be understood, of course, that the convention of state representation may be changed so that light and dark spots correspond to ON and OFF memory element states simply by considering write and erase energy as interchanged in definition.

In order to avoid confusion in the following the convention followed is such that the ON state of a memory element exists when the axes are aligned with the second stable axis and birefringence is absent, resulting in a dark spot in reading and that the OFF state exists when the axes are aligned with the first stable axis and birefringence occurs resulting in a light spot in reading.

It will be apparent to those skilled in the field of information storage that the invention has wide area of applicability. The use of the Smectic C-phase liquid crystal provides a very high density of information storage which theoretically is in the order of $10^{12}$ information storage bits per square inch. This magnitude of storage makes it possible, in principle, to store many volumes of literature in one square inch of crystal. It can be considered that the crystal memory comprises approximately 1,000,000 lines of information each of which includes approximately 1,000,000 bits of information. Suitable optical markings may then be added to the memory to designate smaller segments of memory perhaps having an information storage capacity in the order of magnitude of one page of a book where each line of print may be assumed to have up to 120 characters each of which is represented by up to 100 dots or bits. Thus, if one line of a page is assumed to require in the order of 12,000 bits of representation, and if it is further assumed that the page includes up to 100 lines, it may be seen that something in the order of 100,000 bits might be a suitable representation of a page of literature of very high density.

With this assumption, then, it may be seen that on the order of 10 pages of literature can be stored on one line of the crystal memory of the invention and that with 1,000,000 lines available, the memory capacity in terms of pages is 10,000,000 pages per memory.

The manner in which the liquid crystal memory of the invention is developed and operated will be more fully understood from the following detailed description taken in connection with the accompanying drawings which form part of this specification and in which.

Figure 6:
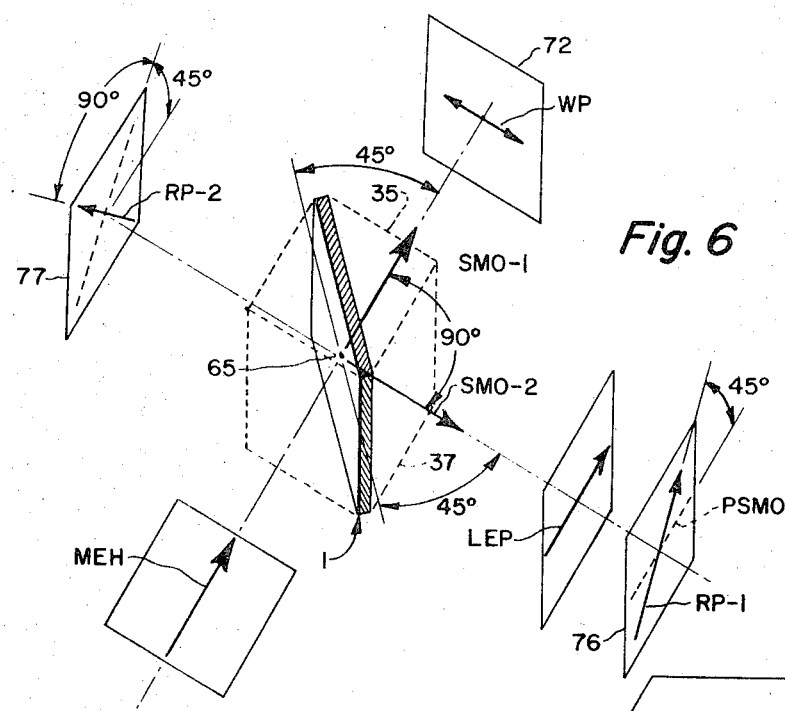
Figure 7:
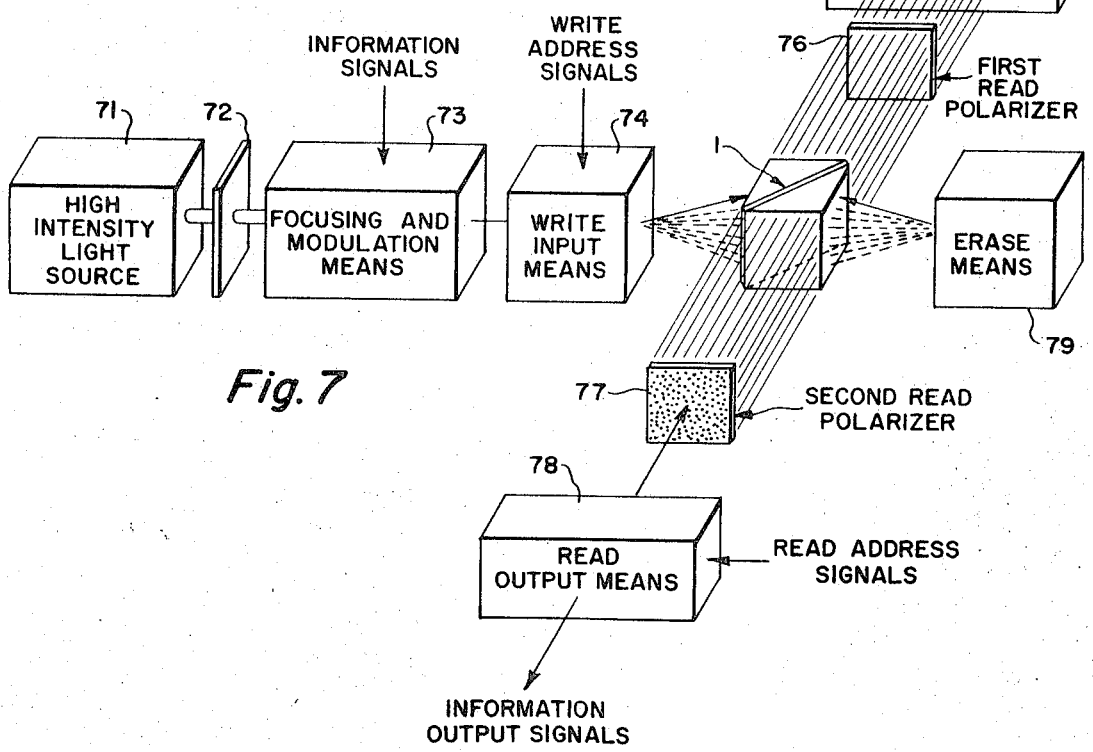

FIG. 6 provides a perspective view of the memory layer and various planes of polarization with reference to the reading, writing and erasing methods of the invention; and FIG. 7 is a block diagram of an optical memory system employing the liquid crystal memory of the invention.

Figure 1:
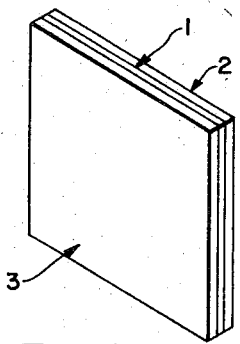
FIG. 1 shows a liquid crystal memory constructed according to the invention.
Figure 2A:
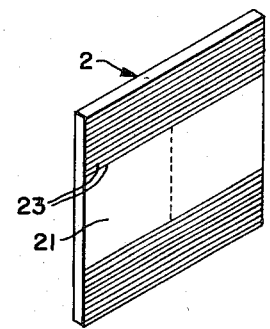
FIGS. 2A and 2B show how the containing surfaces of the memory of FIG. 1 are prepared to cause proper optical homogeneity.
Figure 2B:
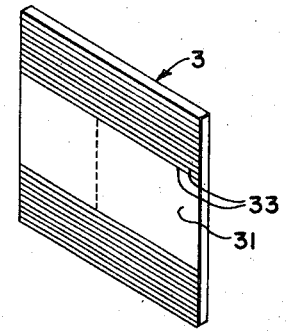

Reference is now made to FIG. 1 where one form of liquid crystal memory constructed according to the present invention is shown. It will be noted that a layer of Smectic C-phase liquid crystal 1 is contained between transparent plates 2 and 3. As shown in FIGS. 2A and 2B, inner surfaces 21 and 31 of the plates 2 and 3 are rubbed along lines 23 and 33, respectively, in order to constrain the direction of the molecular axes in a manner more fully described with reference to FIGS. 4, 5A and 5B. Lines 23 and 33 are not intended to signify that actual lines may be observed after the treatment of the surfaces but rather the direction of the rubbing which must be followed to accomplish the proper alignment of the molecular axes. To insure orientation plates 2 and 3 may be glass treated with a foreign material as, for example, a dilute aqueous (1 percent) solution of polyvinyl alcohol.

Figure 3:
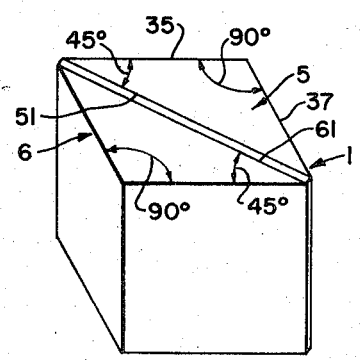
FIG. 3 shows another variation of liquid crystal memory using prisms to avoid bending a light.

Another arrangement of the memory provided by the invention is shown in FIG. 3 where, instead of plates 2 and 3, prisms 5 and 6 are employed. A layer of Smectic C-phase liquid crystal 1 is contained between surfaces 51 and 61 of prisms 5 and 6. Surfaces 51 and 61 are treated in the same manner as surfaces 21 and 31 shown in FIGS. 2A and 2B. The assumption being made that the normal tilt angle is 45°.

Figure 4:
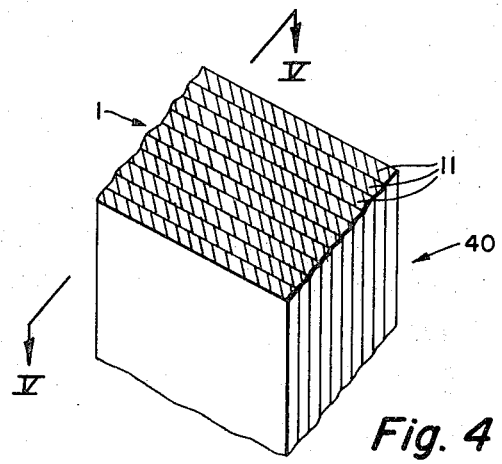
FIG. 4 shows a molecular group taken out of the liquid crystal layer used in the memory of FIGS. 1 or 3, illustrating the formation of molecular layers.

In FIG. 4, a piece 40 of the liquid crystal layer 1 is shown as having a plurality of molecular layers 11 which are parallel to containing surfaces 51 and 61 (FIG. 3).

Figure 5A:
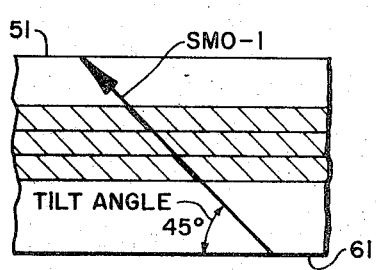
FIGS. 5A and 5B are views taken along line V—V of FIG. 4, showing how the molecular axes of a memory element group are aligned for the first and second stable orientation directions, respectively.
Figure 5B:
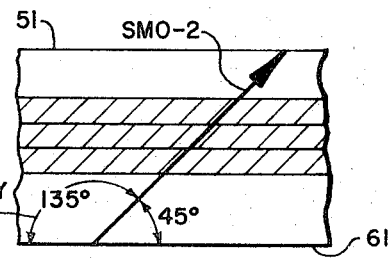

In FIGS. 5A and 5B, the orientation of the molecular axes in the piece 40 shown in FIG. 4 is represented with reference to a plane cutting through the piece perpendicular to surfaces 51 and 61 and parallel to the rubbing lines 23 and 33. The orientation of the molecular axes shown in FIG. 5A is such that all of the axes lie parallel to the plane of the paper which is that representing the plane passed through piece 40 of FIG. 4 and, within this plane, the axes are all parallel to a reference vector SMO-1 representing the first stable molecular axis orientation mentioned above. In FIG. 5B, the molecular axes are assumed to be parallel to the plane of the paper and to be parallel to a second stable molecular axis orientation represented as SMO-2. It will be noted that direction SMO-1 has a tilt angle of 45° with respect to surface 61; whereas direction SMO-2 has a complementary tilt angle of 135° with respect to surface 61. Thus, the angle between directions SMO-1 and SMO-2 is 90°. While this is the preferred orientation of the two stable molecular orientations, it will be understood that substantial variations are possible without departing from the basic concept of the invention. It is only important that the two stable molecular orientations exist and not that they be exactly rotated with respect to each other by 90°. There are other considerations, however, which make the 90° rotation the preferred embodiment of the invention as will be more fully understood when the methods of writing, erasing, and reading are considered.

Accordingly, reference is now made to FIG. 6 which provides a three-dimensional showing of a liquid crystal memory layer 1 as it is referenced to a write electric field polarization direction WP, first and second molecular orientation directions SMO-1 and SMO-2, a first read polarization direction referenced as RP-1, a second read polarization direction referenced as RP-2, a magnetic field erase orientation referenced as MEH and a light erase polarization direction referenced as LEP. All of the direction vectors are referenced to a memory element 65 which, as a matter of convenience, is shown as approximately in the center of the liquid crystal layer. It will be assumed that a number of molecules are included within memory element 65 and that all of the molecular axes within memory element group are oriented parallel to direction SMO-1 or parallel to direction SMO-2.

In considering the operation of writing, it will be assumed that element 65 is in the first stable state with molecular axes aligned along vector SMO-1. A high intensity light beam with an intensity in the order of 1 watt/cm$^2$ which may be obtained from a suitable laser source is then directed to element 65 by suitable means (not shown) after being passed through a polarizer 72 corresponding to the plane containing write electric field vector WP. Since it will be assumed that vector SMO-1 has a tilt angle of substantially 45° with layer 1, it may be assumed that the plane of polarization containing vector WP is at 45° with layer 1. If the prism memory of FIG. 3 is used the write polarization plane is parallel to surface 35 thereof. The light intensity is selected to be sufficient to cause the rotation of all those molecular axes within element 65 from the first stable direction SMO-1 to the second stable direction SMO-2.

As will be more fully understood after a system using the invention has been described as in FIG. 7, the write beam may be scanned in various modes of operation to select a plurality of memory elements such as 65 to store information. During the scanning, the beam intensity is modulated in accordance with the ON-OFF state of the information bits to be stored.

Before continuing it will be helpful to consider the manner in which the molecular orientation is rotated by a high intensity light beam. Since most known liquid crystals with Smectic C-phases are optically positive, at light frequencies the dielectric constant is greater along the long molecular axis than that axis perpendicular thereto. The high intensity light, properly polarized, then causes a torque to be exerted on the selected crystal element or molecular group such as to turn the axis of highest polarizability into the direction of the electric field vector of the light. This torque is equal to $\vec{E} \times \vec{P}$, where $\vec{E}$ is the electric field vector of the light and $\vec{P}$ is the polarizability.

After the high intensity write beam has been directed to element 65, it will assume either an ON or OFF state depending upon whether the energy of the impinging high intensity light beam was sufficient to cause the rotation from the first stable state to the second stable state. Both possibilities will now be considered with reference to the operation of the invention in reading the information stored in element 65. In reading, a source of low intensity light as may be obtained from an incandescent light bulb, is directed to the memory so that the rays of light are parallel to direction SMO-2. Thus, the plane containing the first read polarization direction RP-1 is assumed to be perpendicular to direction SMO-2 or parallel to surface 37 where the prism of FIG. 3 is used. The low intensity light is passed through a polarizer parallel to the plane containing vector RP-1 with the polarization vector RP-1 being directed to assume a 45° angle with respect to line PSMO-1 which represents the projection of direction SMO-1 on the plane of reference. If element 65 has remained in the first stable state after writing, in the case where the intensity of the writing beam is not sufficient to cause rotation from the first stable direction to the second stable direction, rays of the low intensity light will have their polarization rotated by birefringence (more fully described below).

The 45° angle between directions PSMO-1 and RP-1 is selected to permit maximum reading light to be rotated or not. The characteristic of the liquid crystal is such that maximum light passes in angles of 45°, 135°, 225° and 315° between PSMO-1 and RP-1 or every 90° starting from 45°. Minimum light passes for angles of 0°, 90°, 180° and 270°.

The birefringent rotation effect can best be analyzed in terms of the light transmission between crossed polarizers. This may be represented as:

$$I = I_o \sin^2 2\phi \cdot \sin^2 [\pi(N_2 - N_1)t/\lambda]$$

where:

$\phi$ is the angle which the direction of molecular alignment makes with the polarization axis of the first polarizer (45° to give maximum transmission);

$t$ is the thickness of the liquid crystal layers; and $(N_2 - N_1)$ represents the birefringent factor and is, effectively, the difference between the indices of refraction parallel and perpendicular to the molecular alignment.

According to the above equation, when the particular molecular group alignment is in state 1 (aligned with SMO-1), $N_2 - N_1$ is a maximum so that maximum light passes whereas in state 2 (aligned with SMO-2), $N_2 - N_1$ is substantially zero so that little or no light passes.

The reading operation is completed by passing the light passing through selected element 65 through a second plane of polarization containing polarization vector RP-2. This may constitute a second polarizer 77. Thus, if element 65 is in the first stable state, low intensity light will pass through the second plane of polarization. Thus, a light spot appears corresponding to element 65 if it is in the first stable state. If, on the other hand, the write beam causes rotation of the molecular axes of element 65 to the second stable direction, the read light polarization is not rotated because the birefringent effect only operates through molecular orientations which are parallel to the planes of read polarization. Thus, the low intensity light passing through element 65 in this case has the direction of its polarization vector unchanged and at right angles to the polarization direction of the second polarizer and light therefore does not pass through the second polarizer and the stable state of element 65 is, in this case, represented by a dark spot.

It should now be apparent that, after writing in memory layer 1 has been completed, the layer, as viewed, appears as light and dark spots representing ON and OFF states of information bits. It is immaterial, of course, as to whether a light spot represents an ON or OFF state or a binary "1" or "0" and conversely whether the dark spot represents an ON state or an OFF state or a binary "1" or "0." It is only important that the variation in light intensity passing through elements in different states be sufficient to be distinguishable.

It is assumed that, after an information dot pattern has been stored in the manner described above, those skilled in the art will find appropriate means for scanning the stored information in order to translate such information into appropriate signals for various applications. One method is to cause an electron beam to scan across selected parts of the memory constituting words, lines, pages or the like. The amount of information storage which may be provided, according to the invention, is then a complex function depending upon the resolution capabilities possible in reading and writing.

Two methods of performing erasing are contemplated according to the invention. A magnetic field may be passed through the memory, with the field vector referenced as MEH in FIG. 6 being aligned substantially with stable molecular direction SMO-1. In this context it should be understood that the proper definition of all directions as employed herein is to accomplish the desired result. Thus, the direction of vector MEH is such as to cause rotation of all of those molecular axes aligned with SMO-1 to assume such alignment. The other method of erasing is to employ a high intensity light beam which, in the case of a small memory size, may be used to erase the entire memory as is the case of the magnetic field erase. The light beam erase, having an electric field polarization direction LEP (FIG. 6), may also be used for selective erasing of certain memory elements.

Reference is now made to FIG. 7 which shows the general form of a system utilizing the present invention. In FIG. 7, it will be noted that a High Intensity Light Source 71, which may be a Laser source, produces a beam which is passed through a suitable Polarizer 72, adapted to establish write electric field polarization direction WP (FIG. 6) and thence passes to Focusing and Modulation means 73 which responds to Information Signals and produces an output beam having variations in intensity corresponding to the information to be stored in the memory. The output of means 73 is applied to Write Input Means 74 which also receives suitable Write Address Signals representing locations in memory which are to receive energy corresponding to the information to be stored. The write beam is directed to selected memory elements in layer 1 which may be contained between prisms in the form previously considered with respect to FIG. 3. Light from a Low Intensity Source 75 is directed through a suitable First Read Polarizer 76, in the manner previously considered, to illuminate layer 1. This light passes through the layer either with birefringent rotation or not corresponding to the information state read and may be observed through a Second Read Polarizer 77. Suitable Read Output Means 78 are provided which receives Read Address Signals for controlling the scanning of the surface of Polarizer 77, Means 78 may be similar to a television transmitter where the light and dark patterns are translated into corresponding electrical signal variations which constitute information output signals. It will be understood, however, that any means which translates the varying light intensities observed through polarizer 77 will be suitable in the practice of the present invention. Erase Means 79 are shown for passing suitable energy through the memory to cause the rotation of the memory element molecular axes from the ON representing state to the OFF representing state as previously considered. Means 79 may constitute a magnetic source or a high intensity light source depending upon the particular application thereof. In the case of the high intensity light erase, means 79 could include suitable address selection means to permit selective erasing of certain memory elements to permit modification of the memory state without total erasure. It is assumed in the case where a magnetic field is used that the total memory is erased.

From the foregoing, it should now be apparent that the present invention provides a liquid crystal memory, a system utilizing such a memory, and various methods for constructing and operating such a memory. While it has been pointed out that a liquid crystal exhibiting Smectic C-phase characteristics is suitable for use according to the basic concept presented herein, it will be understood that any crystal which can be operated to establish molecular group axis orientation in two stable directions can be used according to the invention.

We claim as our invention:

1. An information storage and read-out system comprising a liquid crystal memory element selected to have first and second stable molecular axis orientations, means for producing a high intensity beam of electromagnetic wave energy and for directing said beam to selected molecular groups comprising storage elements in said liquid crystal memory element, said high intensity beam of electromagnetic wave energy acting to change the molecular orientation of the liquid crystal molecules in said selected molecular groups from a first stable orientation to a second stable orientation, and means for establishing a low intensity electromagnetic wave energy reading source polarized so as to cause birefringent rotation through said selected molecular groups whereby electromagnetic wave energy will pass through only those selected molecular groups in said first molecular orientation.

2. The system of claim 1 wherein said electromagnetic wave energy comprises light energy.

3. The system of claim 2 wherein said liquid crystal is of the semectic C-phase type.

4. The system of claim 2 wherein said high intensity beam comprises polarized light having an electric field vector parallel to said second stable orientation and normal to said first stable orientation.

5. The system of claim 2 including means for producing a beam of electromagnetic wave energy for erasing information stored in said liquid crystal memory element, said latter-mentioned beam acting to change the molecular orientation of all molecular groups in said liquid crystal memory element from said second to said first stable molecular orientation.

6. The system of claim 5 wherein said high intensity beam and said erase beam are directed onto opposite sides of said liquid crystal memory element.

7. The system of claim 2 wherein said reading source comprises a beam of polarized light at right angles to said high intensity beam, said liquid crystal memory element comprising a layer of liquid crystal material disposed at an angle of about 45° with respect to said high intensity and reading beams.

8. The system of claim 1 wherein said low intensity reading source comprises a low intensity light beam directed along and parallel to said second stable orientation, a first read polarizer through which said low intensity beam passes and having a plane of polarization substantially parallel to said first stable molecular axis orientation, the direction of polarization within said first read polarizer causing birefringent rotation of polarized light through those molecular groups having axes oriented parallel to said first stable orientation.

9. The system of claim 8 including a second read polarizer on the side of said memory element opposite said first read polarizer, said second read polarizer having a plane of polarization parallel to said first read polarizer and a polarization direction crossed with respect to said first read polarizer.

10. The system of claim 9 including means for scanning light and dark spots on the surface of said second read polarizer to develop information output signals corresponding to the states of said molecular groups.

* * * * *